United States Patent [19]

Marko et al.

[11] Patent Number: 5,689,806
[45] Date of Patent: Nov. 18, 1997

[54] COMMUNICATION RECEIVER FOR SELECTING BETWEEN SCANNING AND LOCKING TO A CHANNEL AND METHOD THEREFOR

[75] Inventors: Paul Marko, Pembroke Pines, Fla.; Motty Shor, Holon; Mark Rindsberg, Jerusalem, both of Israel; Craig Wadin, Sunrise, Fla.

[73] Assignee: Motorola, Inc., Schaumburg, Ill.

[21] Appl. No.: 578,399

[22] Filed: Dec. 26, 1995

[51] Int. Cl.⁶ .................. H04B 1/06; H04J 3/00
[52] U.S. Cl. .................. 455/38.1; 455/54.1; 455/161.2
[58] Field of Search .................. 455/161.1, 161.2, 455/161.3, 164.2, 168.1, 32.1, 33.1, 38.1, 54.1, 56.1, 184.1, 185.1, 186.1, 181.1; 370/319, 336, 337, 330, 341, 345, 347, 348, 437; 340/825.44

[56] References Cited

U.S. PATENT DOCUMENTS

| | | |
|---|---|---|
| 4,914,649 | 4/1990 | Schwendeman et al. ........ 455/32.1 |
| 5,077,758 | 12/1991 | DeLuca et al. . |
| 5,095,498 | 3/1992 | DeLuca et al. . |
| 5,206,855 | 4/1993 | Schwendeman et al. . |
| 5,289,178 | 2/1994 | Schwendeman . |
| 5,572,516 | 11/1996 | Miya et al. ................ 455/38.1 |

*Primary Examiner*—Reinhard J. Eisenzopf
*Assistant Examiner*—Lester G. Kincaid
*Attorney, Agent, or Firm*—R. Louis Breeden; Keith A. Chanroo

[57] ABSTRACT

A channel scanning communication receiver (204) operates in a system that transmits information in cycles (104) including subsequences (106). The receiver determines whether to operate in a scanning or locked mode by making (302) signal quality pass/fail decisions for subsequences transmitted in a predetermined group of cycles. A decision is made for a transmission of a subsequence, and subsequence active/inactive decisions are made (304) for the subsequences transmitted in the predetermined group of cycles, based upon the signal quality pass/fail decisions made for the subsequences. The receiver determines (306) whether the system is time-shared or continuous, based upon how many active decisions and inactive decisions are made, and selects (310, 312) the scanning or locked mode in accordance with predetermined rules for time-shared or continuous systems, according to whether the system is time-shared or continuous.

30 Claims, 5 Drawing Sheets

100

PRIOR ART

| CONTINUOUS EXAMPLE 502 | SUBSEQ0 | SUBSEQ1 | SUBSEQ2 | SUBSEQ3 | SUBSEQ4 | | SUBSEQ0 | SUBSEQ1 | SUBSEQ2 | SUBSEQ3 | SUBSEQ4 | | REL ACTV | INACTIVE | | 504 |
|---|---|---|---|---|---|---|---|---|---|---|---|---|---|---|---|---|
| (LSB) A | 0 | 0 | 0 | 0 | 0 | A | | | | | | | | | | |
| C | 0 | 0 | 0 | 0 | 0 | C | | | | | | | | | | |
| T | 0 | 0 | 0 | 0 | 0 | T | | | | | | | | | | |
|  | 0 | 0 | 0 | 0 | 0 |  | | | | | | | | | | |
| R | 0 | 0 | 0 | 0 | 0 | R | SUM | | | | | | | | | |
| E | 0 | 0 | 0 | 0 | 0 | E | REGISTER | | | | | | | | | MODE CONTROL |
| G | 0 | 0 | 0 | 0 | 0 | G (AFTER SUB.4) | | | | | STATUS | | | | | RULES |
| CYCLE1(MSB) 0 | 1 | 0 | 1 | 1 | 0 | 4 | 1 | 0 | 1 | 1 | 0 | | 0 | 1 | | CONTINUOUS |
| CYCLE2 | 1 | 0 | 0 | 1 | 0 | | 2 | 0 | 1 | 2 | 0 | | 0 | 1 | | CONTINUOUS |
| CYCLE3 | 1 | 1 | 1 | 1 | 0 | | 3 | 1 | 2 | 3 | 0 | | 0 | 1 | | CONTINUOUS |
| CYCLE4 | 1 | 0 | 1 | 0 | 0 | | 4 | 1 | 3 | 3 | 0 | | 0 | 1 | | CONTINUOUS |
| CYCLE5 | 0 | 1 | 0 | 1 | 0 | | 4 | 2 | 3 | 4 | 0 | | 0 | 1 | | CONTINUOUS |
| CYCLE6 | 1 | 0 | 1 | 1 | 0 | | 5 | 2 | 4 | 5 | 0 | | 0 | 1 | | CONTINUOUS |
| CYCLE7 | 0 | 1 | 1 | 1 | 0 | | 5 | 3 | 5 | 6 | 0 | | 0 | 1 | | CONTINUOUS |
| CYCLE8 | 0 | 1 | 0 | 1 | 1 | | 5 | 4 | 5 | 7 | 1 | | 1 | 0 | | CONTINUOUS |
| CYCLE9 | 0 | 1 | 1 | 1 | 0 | | 4 | 5 | 5 | 7 | 1 | | 1 | 0 | | CONTINUOUS |
| CYCLE10 | 1 | 0 | 0 | 0 | 1 | | 4 | 5 | 5 | 6 | 2 | | 0 | 0 | | CONTINUOUS |
| CYCLE11 | 1 | 1 | 0 | 0 | 0 | | 4 | 5 | 4 | 5 | 2 | | 0 | 0 | | CONTINUOUS |
| CYCLE12 | 0 | 0 | 0 | 0 | 1 | | 3 | 5 | 3 | 5 | 3 | | 0 | 0 | | CONTINUOUS |
| CYCLE13 | 1 | 0 | 1 | 1 | 1 | | 4 | 4 | 4 | 5 | 4 | | 0 | 0 | | CONTINUOUS |
| CYCLE14 | 0 | 1 | 1 | 0 | 0 | | 3 | 5 | 4 | 4 | 4 | | 0 | 0 | | CONTINUOUS |
| CYCLE15 | 1 | 1 | 1 | 1 | 1 | | 4 | 5 | 4 | 4 | 5 | | 0 | 0 | | CONTINUOUS |
| CYCLE16 | 1 | 1 | 0 | 1 | 0 | | 5 | 5 | 4 | 4 | 4 | | 0 | 0 | | CONTINUOUS |
| CYCLE17 | 0 | 1 | 1 | 0 | 1 | | 5 | 5 | 4 | 3 | 5 | | 0 | 0 | | CONTINUOUS |
| CYCLE18 | 0 | 0 | 0 | 0 | 1 | | 4 | 5 | 4 | 3 | 5 | | 0 | 0 | | CONTINUOUS |
| CYCLE19 | 1 | 1 | 0 | 0 | 0 | | 4 | 5 | 4 | 3 | 5 | | 0 | 0 | | CONTINUOUS |
| CYCLE20 | 0 | 0 | 1 | 1 | 1 | | 4 | 5 | 5 | 4 | 5 | | 0 | 0 | | CONTINUOUS |

*FIG. 5*

COMMUNICATION RECEIVER FOR SELECTING BETWEEN SCANNING AND LOCKING TO A CHANNEL AND METHOD THEREFOR

FIELD OF THE INVENTION

This invention relates in general to communication receivers, and more specifically to a scanning communication receiver for selecting between scanning and locking to a channel.

BACKGROUND OF THE INVENTION

Modern messaging protocols, such as the European Radio Message System (ERMES) protocol, require scanning receivers capable of operating on multiple radio frequencies. Such protocols provide roaming capability, allowing receivers to receive messages while moving about a wide area communication system. These protocols also allow great flexibility in regard to system configuration, allowing, for example, time-shared channel operation in some areas and continuous operation in other areas.

The great flexibility of system configuration presents problems to scanning receivers operating in the system, because scanning receivers optimized for continuous channel operation may be "fooled" into unnecessary channel scanning when operating on a time-shared channel. Conversely, receivers optimized for time-shared operation may unnecessarily delay the start of channel scanning when operating on a continuous channel that is going out of range.

Thus, what is needed is a scanning communication receiver that can overcome the problems resulting from mixing continuous channel operation and time-shared channel operation in a communication system. A communication receiver and method of operation are needed that can optimize the channel scanning decision while operating in either a continuous system or a time-shared system.

SUMMARY OF THE INVENTION

An aspect of the present invention is a method in a channel scanning communication receiver operating in a communication system that periodically transmits information in a plurality of cycles, a cycle comprising a plurality of subsequences. The method is for determining whether to operate in a scanning mode or in a locked mode, and comprises the steps of making a plurality of signal quality pass/fail decisions for the plurality of subsequences transmitted in a predetermined plurality of cycles, a decision made for a transmission of a subsequence, and making a plurality of subsequence active/inactive decisions for ones of the plurality of subsequences transmitted in the predetermined plurality of cycles, based upon the plurality of signal quality pass/fail decisions made for the plurality of subsequences. The method further comprises the steps of determining whether the communication system is time-shared, based upon how many active decisions and how many inactive decisions are made for the ones of the plurality of subsequences, and selecting from operation in the scanning mode and operation in the locked mode in accordance with predetermined rules for time-shared systems, in response to the determining step finding that the communication system is time-shared.

A second aspect of the present invention is a method in a channel scanning communication receiver operating in a communication system that periodically transmits information in a plurality of cycles, a cycle comprising a plurality of subsequences. The method is for determining whether to operate in a scanning mode or in a locked mode, and comprises the steps of making a plurality of signal quality pass/fail decisions for the plurality of subsequences transmitted in a predetermined plurality of cycles, a decision made for a transmission of a subsequence, and making a plurality of subsequence active/inactive decisions for ones of the plurality of subsequences transmitted in the predetermined plurality of cycles, based upon the plurality of signal quality pass/fail decisions made for the plurality of subsequences. The method further comprises the steps of determining whether the communication system is time-shared, based upon how many active decisions and how many inactive decisions are made for the ones of the plurality of subsequences, and selecting from operation in the scanning mode and operation in the locked mode in accordance with predetermined rules for continuous systems, in response to the determining step finding that the communication system is continuous.

A third aspect of the present invention is a channel scanning communication receiver for operating in a communication system that periodically transmits information in a plurality of cycles, a cycle comprising a plurality of subsequences. The communication receiver determines whether to operate in a scanning mode or in a locked mode, and comprises an antenna for intercepting a radio signal comprising the information, a receiver element coupled to the antenna for demodulating the information, a processing system coupled to the receiver element for processing the information, ,and a user interface coupled to the processing system for conveying the information to a user. The processing system is programmed for executing the steps of making a plurality of signal quality pass/fail decisions for the plurality of subsequences transmitted in a predetermined plurality of cycles, a decision made for a transmission of a subsequence, and making a plurality of subsequence active/inactive decisions for ones of the plurality of subsequences transmitted in the predetermined plurality of cycles, based upon the plurality of signal quality pass/fail decisions made for the plurality of subsequences. The processing system is further programmed for executing the steps of determining whether the communication system is time-shared, based upon how many active decisions and how many inactive decisions are made for the ones of the plurality of subsequences, and selecting from operation in the scanning mode and operation in the locked mode in accordance with predetermined rules for time-shared systems, in response to the determining step finding that the communication system is time-shared.

A fourth aspect of the present invention is a channel scanning communication receiver for operating in a communication system that periodically transmits information in a plurality of cycles, a cycle comprising a plurality of subsequences. The communication receiver determines whether to operate in a scanning mode or in a locked mode, and comprises an antenna for intercepting a radio signal comprising the information, a receiver element coupled to the antenna for demodulating the information, a processing system coupled to the receiver element for processing the information, and a user interface coupled to the processing system for conveying the information to a user. The processing system is programmed for executing the steps of making a plurality of signal quality pass/fail decisions for the plurality of subsequences transmitted in a predetermined plurality of cycles, a decision made for a transmission of a subsequence, and making a plurality of subsequence active/inactive decisions for ones of the plurality of subsequences transmitted in the predetermined plurality of cycles, based upon the plurality of signal quality pass/fail decisions made for the plurality of subsequences. The processing system is further programmed for executing the steps of determining whether the communication system is time-shared, based upon how many active decisions and how many inactive decisions are made for the ones of the plurality of subsequences, and selecting from operation in the scanning mode and operation in the locked mode in accordance with predetermined rules for continuous systems, in response to the determining step finding that the communication system is continuous.

BRIEF DESCRIPTION OF THE DRAWINGS

FIG. 5 is a table depicting typical receiver register contents in a continuous system in accordance with the preferred embodiment of the present invention.

DESCRIPTION OF THE PREFERRED EMBODIMENT

Figure 1:
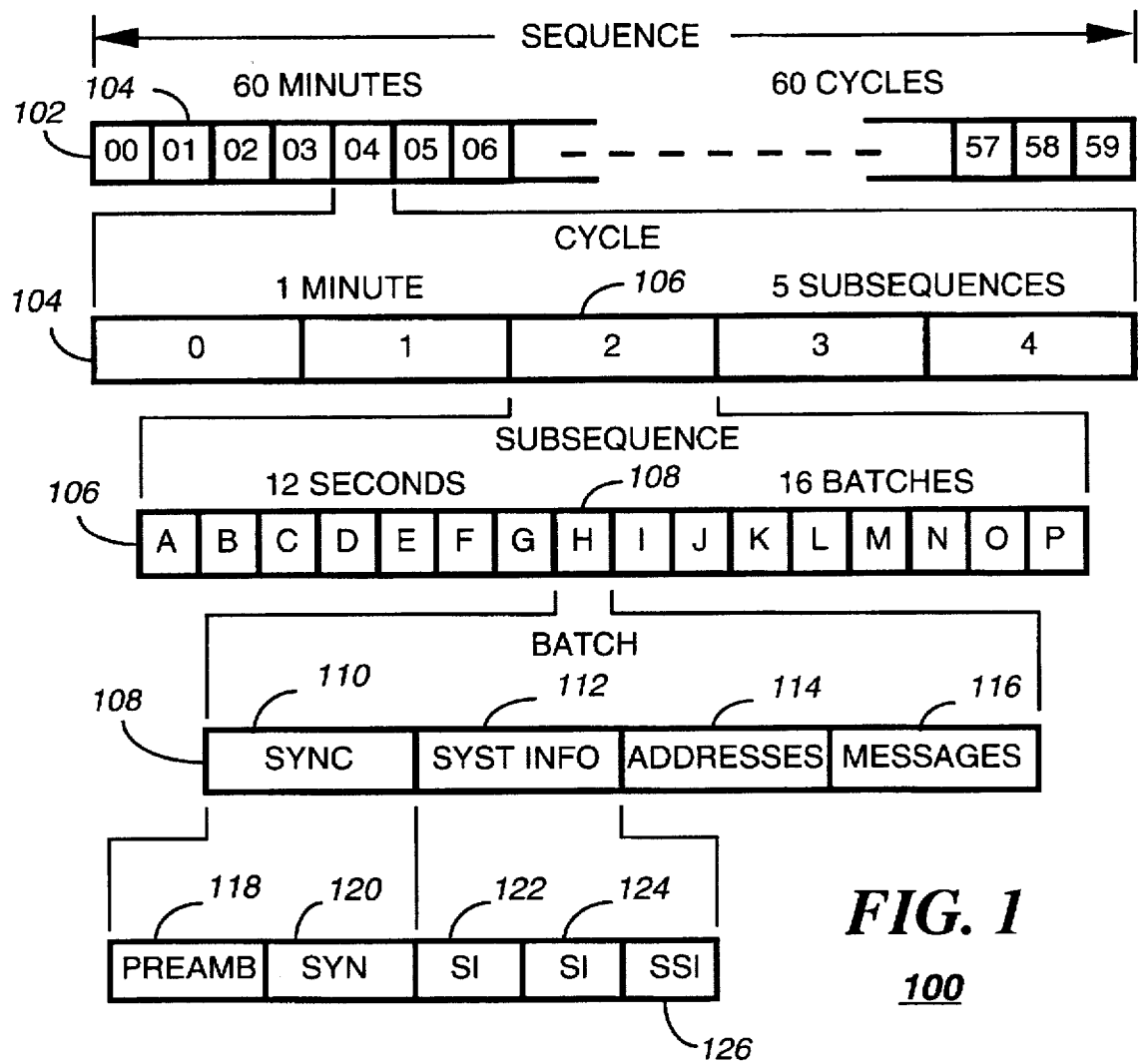
FIG. 1 is a timing diagram of a prior art protocol.

FIG. 1 is a timing diagram of a prior art protocol. The protocol is, by way of example, the European Radio Message System (ERMES) protocol. The ERMES protocol specifies a periodic transmission of a sequence 102 of cycles 104, sixty one-minute cycles being transmitted per hour. Each cycle 104 comprises five subsequences 106 of twelve-second duration, each subsequence 106 comprising sixteen synchronous batches 108. A batch 108 comprises a synchronization partition 110, a system information partition 112, an address partition 114, and a message partition 116. The synchronization partition 110 includes a preamble 118 and a sync code word 120. The system information partition 112 includes first and second system information code words 122, 124 and a supplementary system information code word 126. A communication receiver intended to operate in systems utilizing the ERMES protocol is pre-programmed to receive selected ones of the batches 108 transmitted. A batch 108 pre-programmed for receipt by the communication receiver is said to be an "active" batch 108 for the communication receiver.

It will be appreciated that other protocols that are capable of operating with frequency scanning receivers, e.g., Motorola's FLEX™ protocol, can also be utilized in accordance with the present invention. Both the ERMES protocol and the FLEX™ protocol employ error detecting and correcting Bose-Chadhuri-Hocquenghem (BCH) code words. Such code words are processed in a manner well known in the art to detect and correct received bit errors occurring in the code words so long as there are not too many, e.g., more than two, bit errors in a single code word. When there are more bit errors in a single code word than can be corrected, the code word is said to contain uncorrectable errors.

Figure 2:
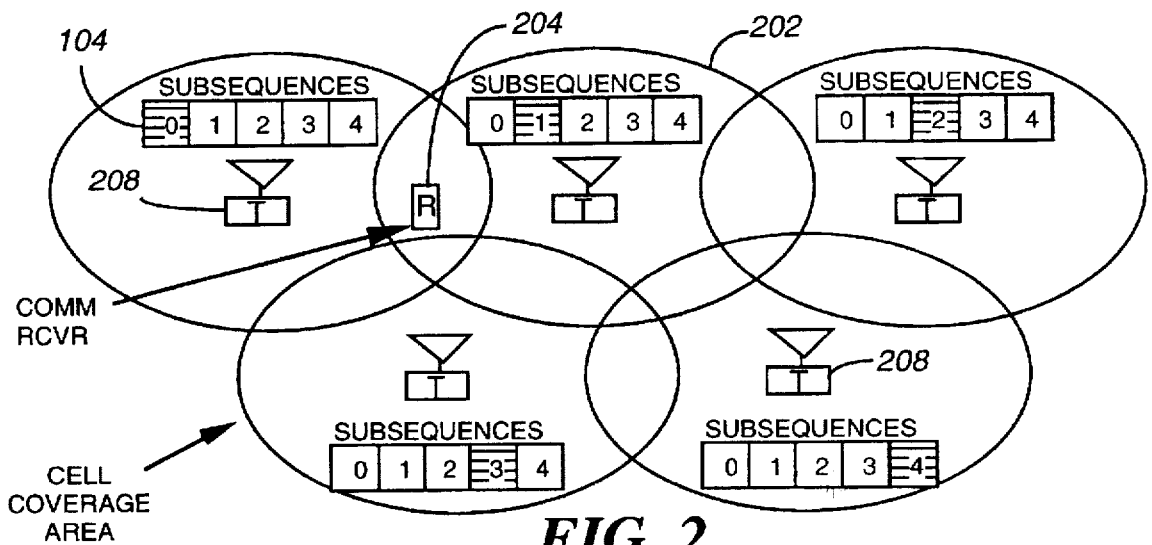
FIG. 2 is a system configuration diagram depicting a time-shared communication system.

FIG. 2 is a system configuration diagram depicting a time-shared communication system. The diagram includes five transmitters 208, all transmitting on the same frequency and providing radio coverage in five cell coverage areas 202. At least one communication receiver 204 operates in the communication system and receives communication signals from at least one of the transmitters 208. The five subsequences 106 are depicted (by the shaded boxes) as being transmitted on a time-shared basis, in only one cell at a time.

In order to operate at maximum efficiency, the communication receiver 204 must perform a system configuration assessment to determine whether the communication system is transmitting on a continuous (i.e., non-time-shared) basis or on a time-shared basis, to allow mode change control with a set of rules optimized for the specific communication system configuration. Since the configuration may change with time, assessment must be repeated on a regular basis.

The time-shared system configuration has the characteristic that the communication receiver 204 will receive reliably on one or more subsequences 106 from nearby transmitters 208 and will not receive on one or more other subsequences 106 from distant ones of the transmitters 208. This performance differs from a simulcast or continuous transmission system, where all subsequences 106 are received substantially uniformly.

Figure 3:
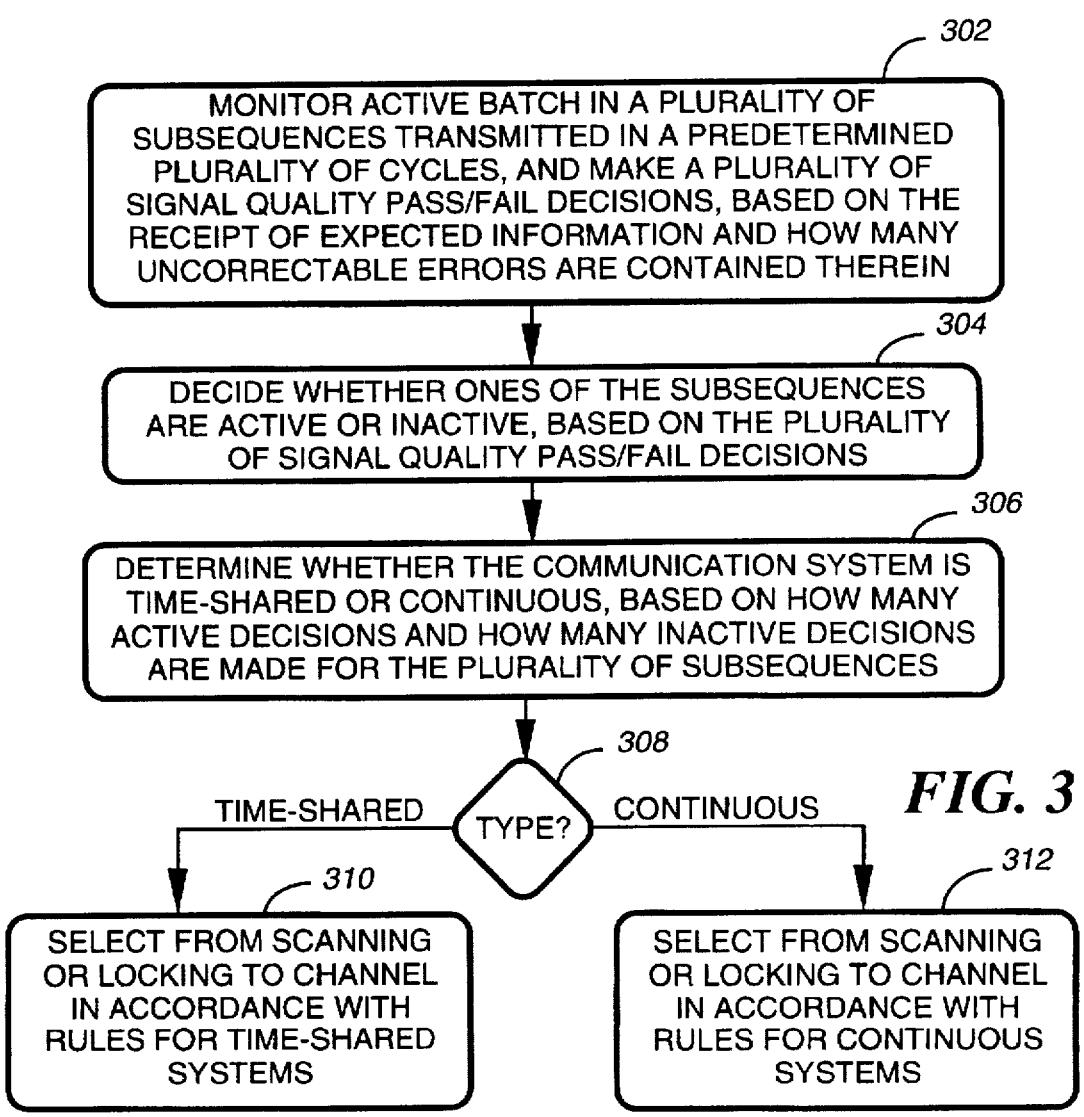
FIG. 3 is a flow chart depicting a method of operation of a communication receiver in accordance with the preferred embodiment of the present invention.

FIG. 3 is a flow chart depicting a method of operation of the communication receiver 204 in accordance with the preferred embodiment of the present invention. Briefly, the communication receiver 204 monitors 302 the active batch in a plurality of the subsequences 106 transmitted in a predetermined plurality of the cycles 104. The communication receiver 204 then makes a plurality of signal quality pass/fail decisions, based on whether or not expected information, e.g., the preamble 118, the sync code word 120, and the code words of the system information partition 112, has been received, and further based on how many uncorrectable errors were detected in selected ones of the code words received. This step of monitoring and making signal quality pass/fail decisions is described in further detail herein below.

Next, the communication receiver 204 decides 304 whether ones of the subsequences are active or inactive, based on the plurality of signal quality pass/fail decisions made in step 302. Then, the communication receiver 204 determines 306 whether the communication system which is being received is time-shared or continuous, based on how many active decisions and how many inactive decisions are made for the plurality of subsequences. The preferred procedures for making the decisions and the determination of steps 304 and 306 also are described herein below in greater detail.

In step 308 the communication receiver 204 directs the flow in one of two directions based on the type of system. If the system is determined to be a time-shared system, then the communication receiver 204 selects from scanning another frequency or locking to the currently selected channel, in accordance with predetermined rules for time-shared systems. If, on the other hand, the system is determined to be a continuous system, then the communication receiver 204 selects from scanning another frequency or locking to the currently selected channel, in accordance with predetermined rules for continuous systems. The scanning/locking rules for time-shared and continuous systems are presented in further detail herein below.

Figure 4:
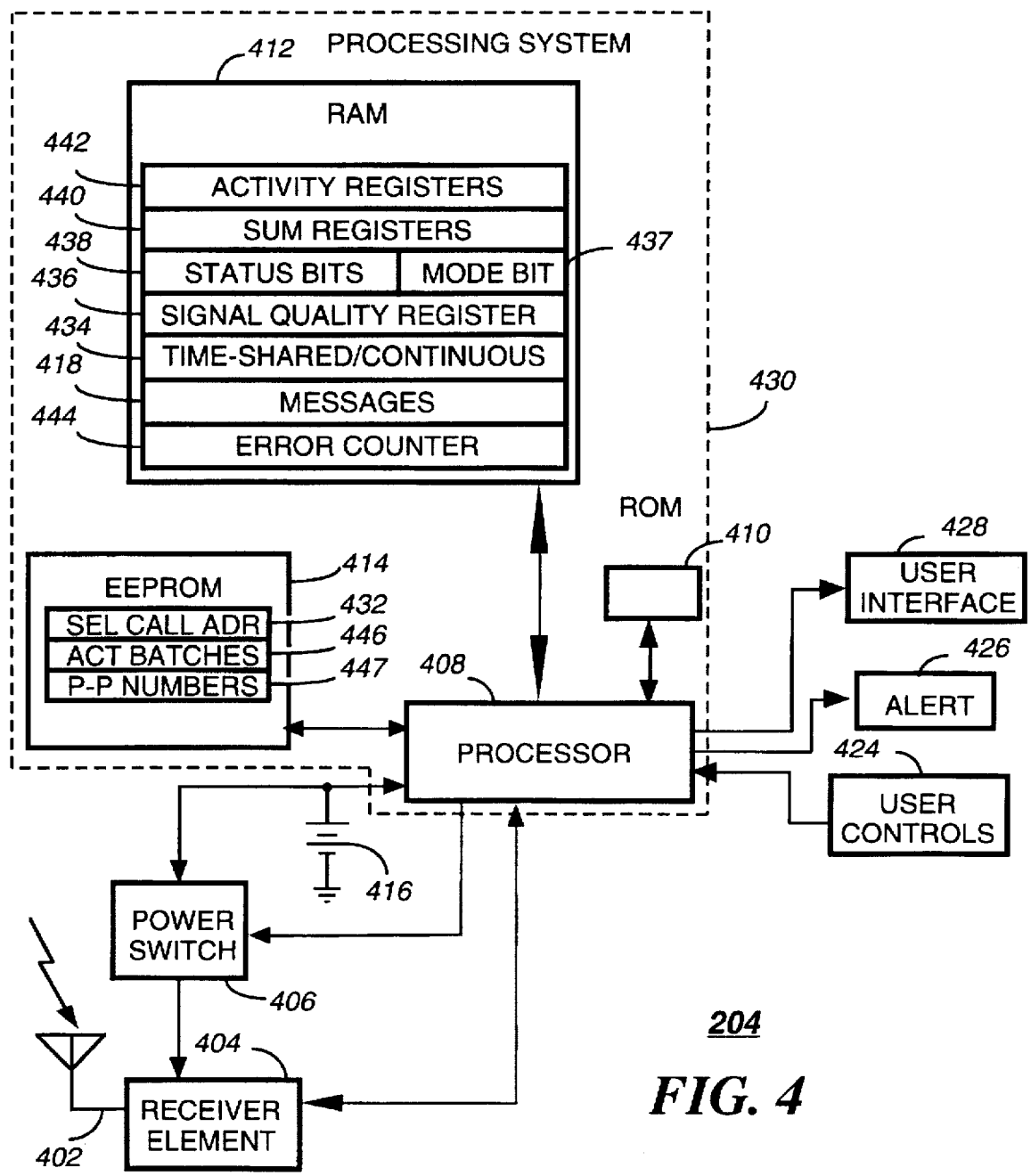
FIG. 4 is an electrical block diagram of the communication receiver in accordance with the preferred embodiment of the present invention.

FIG. 4 is an electrical block diagram of the communication receiver 204 in accordance with the preferred embodiment of the present invention. The communication receiver 204 comprises a receiver antenna 402 for intercepting a communication signal from transmitters, such as the transmitters 208. The receiver antenna 402 is coupled to a receiver element 404, which utilizes conventional demodulation techniques for receiving the communication signal. Radio signals received by the receiver element 404 produce a demodulated signal, which is coupled to a processing system 430 for processing messages received from the transmitters. A conventional power switch 406, coupled to the processing system 430 and coupled to a battery 416 is used to control the supply of power to the receiver element 404, thereby providing a battery saving function.

To perform the necessary functions of the communication receiver 204, the processing system 430 comprises a processor 408 coupled to a random access memory (RAM) 412, a read-only memory (ROM) 410, and an electrically erasable programmable read-only memory (EEPROM) 414. Preferably, the processor 408 is similar to the M68HC08 micro-controller manufactured by Motorola, Inc. It will be appreciated that other similar processors can be utilized for the processor 408, and that additional processors of the same or alternative type, as well as a hardware decoder, can be added as required to handle the processing requirements of the processing system 430. It will be also appreciated that other types of memory, e.g., EEPROM or FLASH, can be utilized for the ROM 410, as well as the RAM 412. It will be further appreciated that the RAM 412 and the ROM 410, singly or in combination, can be incorporated as an integral portion of the processor 408.

The processing system 430 is programmed by way of the ROM 410 to determine whether to operate in a scanning mode or in a locked mode in accordance with the present invention, as described below. The RAM 412 preferably comprises five activity registers 442 and five sum registers 440, corresponding to the five subsequences 106 of each cycle 104. The RAM 412 preferably further comprises a location for storing two status bits 438 for recording "inactive" and "reliably active" status indications determined for the communication system, and a mode bit 437 for keeping track of whether the communication receiver 204 is in a scanning mode or a locked mode. The RAM 412 preferably also includes a signal quality register 436 for maintaining a record of P (e.g., P=16) signal quality pass/fail decisions for the P most recent transmissions of the plurality of subsequences 106. In addition, the RAM 412 includes a location for recording a time-shared/continuous status 434 determined for the communication system, and an error counter 444 for keeping track of code word errors in accordance with the present invention. The processing system 430 is also pre-programmed by way of the EEPROM 414 for determining the active batches 446 which the communication receiver 204 is assigned to monitor for its selective call address, and for operating responsive to pre-programmed numbers 447 in accordance with the present invention.

For each active batch 108, a signal quality pass/fail decision is made by the processing system 430 based on detecting expected information in the received signal, and further based on how many uncorrectable errors exist in the expected information. Preferably, if the preamble 118 and the sync code word 120 are not detected at their expected times, the batch fails. If the preamble 118 and the sync code word 120 are detected, the error counter 444 in the processing system 430 is incremented for any of the first three code words 122, 124, 126 of the system information partition 112 that contain uncorrectable errors. If the error counter 444 reaches 2 or more, the batch 108 fails. If the counter is less than 2, the batch 108 passes.

In summary:

| Active Batch Signal Quality | Criteria |
|---|---|
| Pass | Preamble & sync correlate and<2 bad code words; |
| Fail | Preamble & sync fail or 2+ bad code words. |

Preferably, the signal quality register 436 is sixteen bits wide and is initialized to $FFFF each time a new home channel is acquired by the communication receiver 204. The signal quality register 436 is maintained on each active batch as follows:

| Active Batch Signal Quality | Signal Quality Register Action |
|---|---|
| Pass | Shift register right, set MSB to 1; |
| Fail | Shift register right, set MSB to 0. |

Identification of inactive subsequence transmissions requires observations on the channel for several cycles 104 to avoid inaccurate classification due to normal channel conditions such as fading. In order to meet this requirement, each active subsequence 106 (as defined by the active batches 446) is assigned one of the activity registers 442 and one of the sum registers 440. Each time a new home channel is acquired, the five activity registers 442 and the five sum registers 440 are initialized to $00. Each activity register 442 defined to be active is adjusted based on signal quality as follows during the respective active batch received during each subsequence 106 transmitted over a predetermined number of (e.g., eight) cycles 104.

| Active Batch Signal Quality | Activity Register Action |
|---|---|
| Pass | Shift register right, set MSB to 1; |
| Fail | Shift register right, set MSB to 0. |

After each adjustment of one of the activity registers 442, all bits of the register are added and the result is stored in the corresponding sum register 440. Then the two status bits 438 ("inactive" and "reliably active") are initialized to 0 for later use. The contents of the activity and sum registers 442, 440 are maintained until a next adjustment is required. The active sum registers 440 are then used to determine the system configuration. Each active sum register 440 is checked for 0. If any of the active sum registers 440 contain 0, indicating none of the last 8 subsequences 106 were detected, the "inactive" one of the two status bits 438 is set. Next, each active sum register 440 is compared with 7. If any of the active sum registers 440 are 7 or greater, indicating 7 or 8 of the last 8 subsequences 106 were detected, the "reliably active" one of the two status bits 438 is set. On completion, if both the "inactive" and "reliably active" bits are set, the system is determined to be time-shared, and the rules for time-shared systems are used for mode changes. Otherwise, the rules for continuous systems are used. The system configuration determination procedure is repeated after each active batch and the mode control rules may be switched on a batch by batch basis.

FIG. 5 is a table depicting typical receiver register contents in a continuous system in accordance with the preferred embodiment of the present invention. Contents of the 0th activity register 442 after a first cycle 104 of five subsequences 106 has been received are depicted in a first sliding box 502. Contents of the 4th activity register 442 after the first cycle 104 of subsequences 106 has been received are depicted in a second sliding box 504. Note that after the first cycle 104 the sum registers 440 corresponding to each subsequence 106 contain the sum of the eight values contained in sliding boxes 502, 504 corresponding to the activity register 442 for the subsequence 106 (containing the eight most recent receptions of the subsequence 106). If one visualizes the sliding boxes 502, 504 moving down through each transmission cycle (along with three additional sliding boxes for the 1st, 2nd, and 3rd subsequences 106), one can verify the values that will occur in the sum registers 440, as depicted in the table of FIG. 5. Note also that, for each cycle 104, whenever at least one of the sum registers 440 contains a zero value, the "inactive" one of the two status bits 438 is set, and further that whenever at least one of the sum registers 440 contains a value of seven or greater, the "reliably active" one of the two status bits 438 is set. Because the two status bits 438 are never both set in the table of FIG. 5, the rules that apply for scanning or locking mode control are the rules for continuous systems.

By operating as described, a plurality of records is maintained in the activity registers 442 of the N (e.g., N=8) most recent signal quality pass/fail decisions corresponding to the ones of the plurality of subsequences transmitted in the predetermined plurality of cycles. Also, a plurality of sums corresponding to the plurality of subsequences is maintained in the sum registers 440, each sum indicative of how many of the N most recent signal quality pass/fail decisions for a corresponding one of the plurality of records are "pass". In addition, ones of the plurality of subsequences 106 are defined to be "inactive" in response to corresponding ones of the plurality of sums being equal to zero, and others of the plurality of subsequences 106 are defined to be "reliably active" in response to the corresponding ones of the plurality of sums being greater than a predetermined value (e.g., 7).

Figure 6:
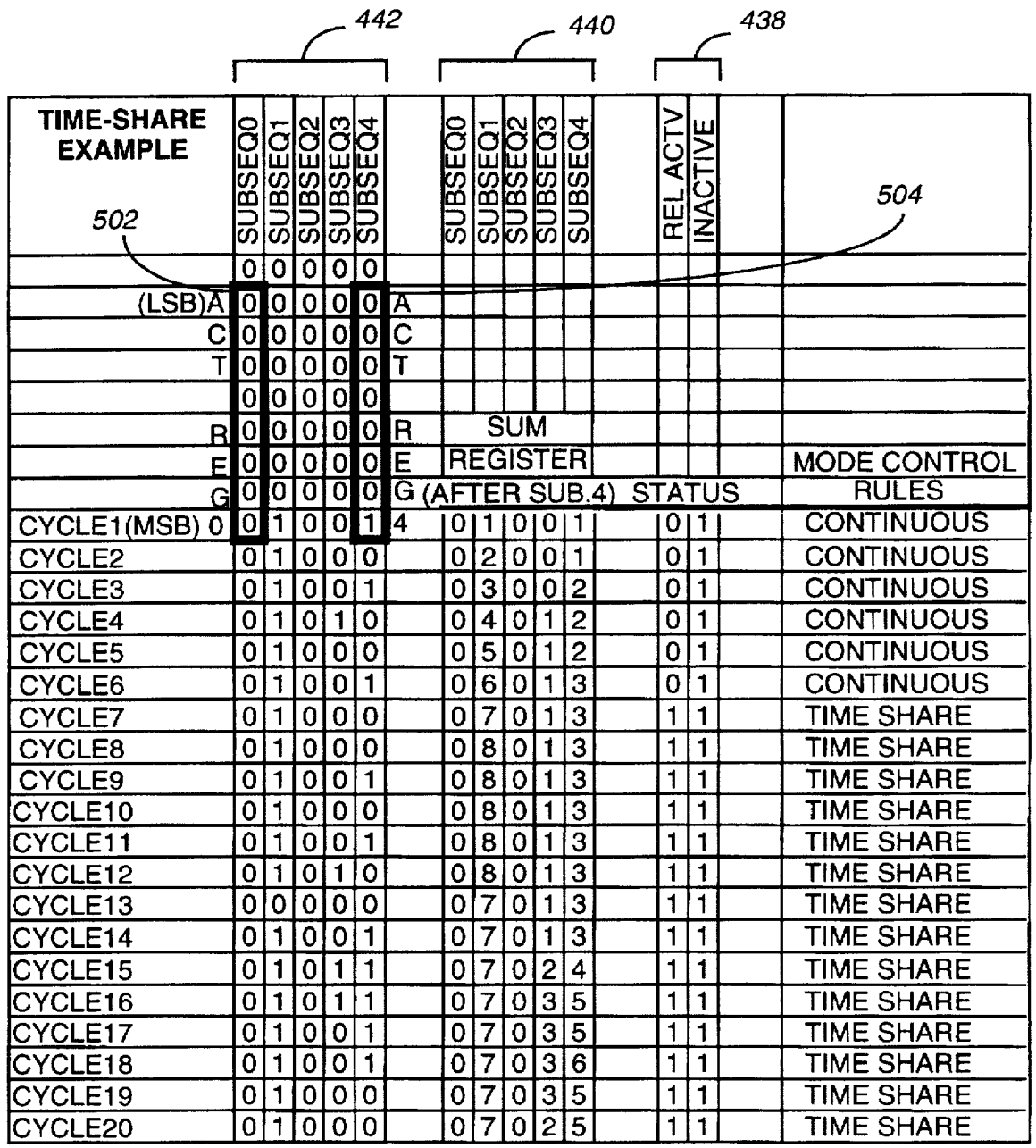
FIG. 6 is a table depicting typical receiver register contents in a time-shared system in accordance with the preferred embodiment of the present invention.

FIG. 6 is a table depicting typical receiver register contents in a time-shared system in accordance with the preferred embodiment of the present invention. The table of FIG. 6 is similar to that of FIG. 5, the essential difference being that the data of FIG. 6 correspond to typical values for a time-shared system. Note that for all cycles 104 after the sixth cycle 104, the two status bits 438 are both set, thereby indicating that the mode control rules which apply are the rules for time-shared systems.

The rules for mode control in a time-shared system depend on whether the pager is locked or scanning. The mode bit 437 (0=locked, 1=scanning) is initialized to 0 each time a new home channel is acquired, and the mode bit 437 is controlled thereafter by the active rules for mode control. In the event that the active rules are the rules for time-shared systems, the rules are as follows:

If the mode bit 437=0 (Locked Mode), then the M most significant bits (corresponding to the M most recent transmissions of the subsequences) of the P-bit signal quality register 436 are checked (e.g., M=5 and P=16). If all bits are 0, indicating signal quality failed on the last M consecutive subsequences 106, the mode bit 437 is set to 1 and the communication receiver 204 enters the synchronous Scanning Mode.

If the mode bit 437=1 (Scanning Mode), then the "reliably active" bit of the two status bits 438 is checked. As a result of the system configuration determination procedure, the "reliably active" bit is set only if at least one subsequence 106 has passed the signal quality test on at least 7 of the last 8 cycles. In a time-shared system, 7 of 8 transmissions detected on 1 subsequence represents good reception, and further scanning is not required. Therefore, if the "reliably active" bit is set, then the processing system 430 resets the mode bit 437 to 0, and the communication receiver 204 enters Locked Mode. Note that if the communication receiver 204 is receiving on only 1 subsequence 106 and this subsequence 106 is missed on 2 consecutive cycles 104, the communication receiver 204 will begin applying the rules for mode control for continuous systems.

The rules for mode control in a continuous system also depend on whether the pager is locked or scanning. In the event that the active rules are the rules for continuous systems, the rules are as follows:

If the mode bit 437=0 (Locked Mode), then the bits in the P-bit signal quality register 436 are summed. If the result is less than or equal to a first pre-programmable number, e.g., 11, then the mode bit 437 is set to 1 and the communication receiver 204 enters the synchronous Scanning Mode.

If the mode bit 437=1 (Scanning Mode), then the bits in the P-bit signal quality register 436 are summed. If the result is greater than or equal to a second pre-programmable number, e.g., 14, then the mode bit 437 is reset to 0 and the communication receiver 204 enters Locked Mode.

By determining whether the communication system being received is a time-shared system or a continuous system, the communication receiver 204 in accordance with the present invention advantageously adjusts its rules of selecting the Scanning Mode or the Locked Mode according to what is most efficient for the particular system being received. Unnecessary scanning is advantageously avoided in a time-shared system, and delays in initiating scanning in a continuous system after encountering a declining signal are advantageously minimized.

Once the communication receiver 204 has acquired and locked to a channel, the processing system 430 is further programmed by way of the ROM 410 to process incoming messages. To process a message, the processor 408 periodically activates the receiver element 404 through the power switch 406. During message processing, the processor 408 decodes in a conventional manner an address in the demodulated data of the message, compares the decoded address with one or more selective call addresses 432 stored in the EEPROM 414, and when a match is detected, the processor 408 proceeds to decode a message partition until either the message is detected or a timeout period of 12 seconds expires.

Once the processor 408 has processed the message, it stores the message in a location for messages 418 in the RAM 412, and a call alerting signal is generated to alert a user that a message has been received. The call alerting signal is directed to a conventional audible or tactile alerting device 426 for generating an audible or tactile call alerting signal. The message can be accessed by the user through user controls 424, which provide functions such as lock, unlock, delete, read, etc. More specifically, by the use of appropriate functions provided by the user controls 424, the message is recovered from the RAM 412, and then conveyed to the user through a user interface 428, e.g., a conventional liquid crystal display (LCD), or a loudspeaker.

It should be apparent by now that the present invention provides a scanning communication receiver and a method therefor that can overcome the problems resulting from mixing continuous channel operation and time-shared channel operation in a communication system. A communication receiver and method of operation are provided that advantageously optimize the channel scanning decision while operating in either a continuous system or a time-shared system.

While the foregoing description has presented a preferred embodiment in accordance with the present invention, it will be appreciated by one of ordinary skill in the art that various changes and modifications can be made without departing from the scope and intent of the present invention. Accordingly, the scope and intent of the present invention are delimited only in accordance with the following claims.

What is claimed is:

1. A method in a channel scanning communication receiver operating in a communication system that periodically transmits information in a plurality of cycles, a cycle comprising a plurality of subsequences, the method for determining whether to operate in a scanning mode or in a locked mode, the method comprising the steps of:

making a plurality of signal quality pass/fail decisions for the plurality of subsequences transmitted in a predetermined plurality of cycles, a decision made for a transmission of a subsequence;

making a plurality of subsequence active/inactive decisions for ones of the plurality of subsequences transmitted in the predetermined plurality of cycles, based upon the plurality of signal quality pass/fail decisions made for the plurality of subsequences;

determining whether the communication system is time-shared, based upon how many active decisions and how many inactive decisions are made for the ones of the plurality of subsequences; and selecting from operation in the scanning mode and operation in the locked mode in accordance with predetermined rules for time-shared systems, in response to the determining step finding that the communication system is time-shared.

2. The method of claim 1, wherein the subsequence comprises a plurality of synchronous batches, and wherein one of the plurality of synchronous batches assigned for use by the communication receiver is defined as an active batch, and wherein the step of making a plurality of signal quality pass/fail decisions for the plurality of subsequences comprises the step of monitoring the active batch in ones of the plurality of subsequences.

3. The method of claim 1, wherein the step of making a plurality of signal quality pass/fail decisions comprises for a transmission of the subsequence the steps of:

determining that signal quality passes in response to (a) detecting expected information, and (b) counting less than a predetermined number of uncorrectable errors in the expected information; and otherwise determining that the signal quality fails.

4. The method of claim 1, wherein the step of selecting from operation in the scanning mode and operation in the locked mode comprises the step of changing from a locked mode to a scanning mode in response to the plurality of signal quality pass/fail decisions being "fail" in M most recent transmissions of the plurality of subsequences, M being a predetermined positive integer value.

5. The method of claim 1, wherein the step of making a plurality of subsequence active/inactive decisions comprises the steps of:

maintaining a plurality of records of N most recent signal quality pass/fail decisions corresponding to the ones of the plurality of subsequences transmitted in the predetermined plurality of cycles, N being a predetermined positive integer value;

maintaining a plurality of sums corresponding to the plurality of subsequences, a sum indicative of how many of the N most recent signal quality pass/fail decisions for a corresponding one of the plurality of records are "pass";

defining ones of the plurality of subsequences to be "inactive" in response to corresponding ones of the plurality of sums being equal to zero; and defining the ones of the plurality of subsequences to be "reliably active" in response to the corresponding ones of the plurality of sums being greater than a predetermined value.

6. The method of claim 5, wherein the step of selecting from operation in the scanning mode and operation in the locked mode comprises the steps of:

changing from a scanning mode to a locked mode in response to at least one of the plurality of subsequences being defined as reliably active.

7. The method of claim 5, wherein the step of determining whether the communication system is time-shared comprises the steps of:

determining the communication system to be time-shared in response to at least one of the plurality of subsequences being defined as inactive and at least one of the plurality of subsequences being defined as reliably active; and otherwise determining the communication system to be continuous.

8. A method in a channel scanning communication receiver operating in a communication system that periodically transmits information in a plurality of cycles, a cycle comprising a plurality of subsequences, the method for determining whether to operate in a scanning mode or in a locked mode, the method comprising the steps of:

making a plurality of signal quality pass/fail decisions for the plurality of subsequences transmitted in a predetermined plurality of cycles, a decision made for a transmission of a subsequence;

making a plurality of subsequence active/inactive decisions for ones of the plurality of subsequences transmitted in the predetermined plurality of cycles, based upon the plurality of signal quality pass/fail decisions made for the plurality of subsequences;

determining whether the communication system is time-shared, based upon how many active decisions and how many inactive decisions are made for the ones of the plurality of subsequences; and selecting from operation in the scanning mode and operation in the locked mode in accordance with predetermined rules for continuous systems, in response to the determining step finding that the communication system is continuous.

9. The method of claim 8, wherein the subsequence comprises a plurality of synchronous batches, and wherein one of the plurality of synchronous batches assigned for use by the communication receiver is defined as an active batch, and wherein the step of making a plurality of signal quality pass/fail decisions for the plurality of subsequences comprises the step of monitoring the active batch in ones of the plurality of subsequences.

10. The method of claim 8, wherein the step of making a plurality of signal quality pass/fail decisions comprises for a transmission of the subsequence the steps of:

determining that signal quality passes in response to (a) detecting expected information, and (b) counting less than a predetermined number of uncorrectable errors in the expected information; and otherwise determining that the signal quality fails.

11. The method of claim 8, wherein the step of making a plurality of subsequence active/inactive decisions comprises the steps of:

maintaining a plurality of records of N most recent signal quality pass/fail decisions corresponding to the ones of the plurality of subsequences transmitted in the predetermined plurality of cycles, N being a predetermined positive integer value;

maintaining a plurality of sums corresponding to the plurality of subsequences, a sum indicative of how many of the N most recent signal quality pass/fail decisions for a corresponding one of the plurality of records are "pass";

defining ones of the plurality of subsequences to be "inactive" in response to corresponding ones of the plurality of sums being equal to zero; and defining the ones of the plurality of subsequences to be "reliably active" in response to the corresponding ones of the plurality of sums being greater than a predetermined value.

12. The method of claim 8, wherein the step of determining whether the communication system is time-shared comprises the steps of:

determining the communication system to be time-shared in response to at least one of the plurality of subsequences being defined as inactive and at least one of the plurality of subsequences being defined as reliably active; and otherwise determining the communication system to be continuous.

13. The method of claim 8, further comprising the step of maintaining a record of P signal quality pass/fail decisions for P most recent transmissions of the plurality of subsequences, P being a predetermined positive integer value.

14. The method of claim 13, wherein the step of selecting from operation in the scanning mode and operation in the locked mode comprises the step of changing from the locked mode to the scanning mode in response to the plurality of signal quality pass/fail decisions being "fail" in more than a pre-programmable number of the P most recent transmissions.

15. The method of claim 13, wherein the step of selecting from operation in the scanning mode and operation in the locked mode comprises the step of changing from the scanning mode to the locked mode in response to the plurality of signal quality pass/fail decisions being "pass" in more than a pre-programmable number of the P most recent transmissions.

16. A channel scanning communication receiver for operating in a communication system that periodically transmits information in a plurality of cycles, a cycle comprising a plurality of subsequences, the communication receiver determining whether to operate in a scanning mode or in a locked mode, the communication receiver comprising:

an antenna for intercepting a radio signal comprising the information;

a receiver element coupled to the antenna for demodulating the information;

a processing system coupled to the receiver element for processing the information; and a user interface coupled to the processing system for conveying the information to a user, wherein the processing system is programmed for executing the steps of:

making a plurality of signal quality pass/fail decisions for the plurality of subsequences transmitted in a predetermined plurality of cycles, a decision made for a transmission of a subsequence;

making a plurality of subsequence active/inactive decisions for ones of the plurality of subsequences transmitted in the predetermined plurality of cycles, based upon the plurality of signal quality pass/fail decisions made for the plurality of subsequences;

determining whether the communication system is time-shared, based upon how many active decisions and how many inactive decisions are made for the ones of the plurality of subsequences; and selecting from operation in the scanning mode and operation in the locked mode in accordance with predetermined rules for time-shared systems, in response to the determining step finding that the communication system is time-shared.

17. The communication receiver of claim 16, wherein the subsequence comprises a plurality of synchronous batches, and wherein one of the plurality of synchronous batches assigned for use by the communication receiver is defined as an active batch, and wherein the step of making a plurality of signal quality pass/fail decisions for the plurality of subsequences comprises the step of monitoring the active batch in ones of the plurality of subsequences.

18. The communication receiver of claim 16, wherein the step of making a plurality of signal quality pass/fail decisions comprises for a transmission of the subsequence the steps of:

determining that signal quality passes in response to (a) detecting expected information, and (b) counting less than a predetermined number of uncorrectable errors in the expected information; and otherwise determining that the signal quality fails.

19. The communication receiver of claim 16, wherein the step of selecting from operation in the scanning mode and operation in the locked mode comprises the step of changing from a locked mode to a scanning mode in response to the plurality of signal quality pass/fail decisions being "fail" in M most recent transmissions of the plurality of subsequences, M being a predetermined positive integer value.

20. The communication receiver of claim 16, wherein the step of making a plurality of subsequence active/inactive decisions comprises the steps of:

maintaining a plurality of records of N most recent signal quality pass/fail decisions corresponding to the ones of the plurality of subsequences transmitted in the predetermined plurality of cycles, N being a predetermined positive integer value;

maintaining a plurality of sums corresponding to the plurality of subsequences, a sum indicative of how many of the N most recent signal quality pass/fail decisions for a corresponding one of the plurality of records are "pass";

defining ones of the plurality of subsequences to be "inactive" in response to corresponding ones of the plurality of sums being equal to zero; and defining the ones of the plurality of subsequences to be "reliably active" in response to the corresponding ones of the plurality of sums being greater than a predetermined value.

21. The communication receiver of claim 20, wherein the step of selecting from operation in the scanning mode and operation in the locked mode comprises the steps of:

changing from a scanning mode to a locked mode in response to at least one of the plurality of subsequences being defined as reliably active.

22. The communication receiver of claim 20, wherein the step of determining whether the communication system is time-shared comprises the steps of:

determining the communication system to be time-shared in response to at least one of the plurality of subsequences being defined as inactive and at least one of the plurality of subsequences being defined as reliably active; and otherwise determining the communication system to be continuous.

23. A channel scanning communication receiver for operating in a communication system that periodically transmits information in a plurality of cycles, a cycle comprising a plurality of subsequences, the communication receiver determining whether to operate in a scanning mode or in a locked mode, the communication receiver comprising:

an antenna for intercepting a radio signal comprising the information;

a receiver element coupled to the antenna for demodulating the information;

a processing system coupled to the receiver element for processing the information; and a user interface coupled to the processing system for conveying the information to a user, wherein the processing system is programmed for executing the steps of:

making a plurality of signal quality pass/fail decisions for the plurality of subsequences transmitted in a predetermined plurality of cycles, a decision made for a transmission of a subsequence;

making a plurality of subsequence active/inactive decisions for ones of the plurality of subsequences transmitted in the predetermined plurality of cycles, based upon the plurality of signal quality pass/fail decisions made for the plurality of subsequences;

determining whether the communication system is time-shared, based upon how many active decisions and how many inactive decisions are made for the ones of the plurality of subsequences; and selecting from operation in the scanning mode and operation in the locked mode in accordance with predetermined rules for continuous systems, in response to the determining step finding that the communication system is continuous.

24. The communication receiver of claim 23, wherein the subsequence comprises a plurality of synchronous batches, and wherein one of the plurality of synchronous batches assigned for use by the communication receiver is defined as an active batch, and wherein the step of making a plurality of signal quality pass/fail decisions for the plurality of subsequences comprises the step of monitoring the active batch in ones of the plurality of subsequences.

25. The communication receiver of claim 23, wherein the step of making a plurality of signal quality pass/fail decisions comprises for a transmission of the subsequence the steps of:

determining that signal quality passes in response to (a) detecting expected information, and (b) counting less than a predetermined number of uncorrectable errors in the expected information; and otherwise determining that the signal quality fails.

26. The communication receiver of claim 23, wherein the step of making a plurality of subsequence active/inactive decisions comprises the steps of:

maintaining a plurality of records of N most recent signal quality pass/fail decisions corresponding to the ones of the plurality of subsequences transmitted in the predetermined plurality of cycles, N being a predetermined positive integer value;

maintaining a plurality of sums corresponding to the plurality of subsequences, a sum indicative of how many of the N most recent signal quality pass/fail decisions for a corresponding one of the plurality of records are "pass";

defining ones of the plurality of subsequences to be "inactive" in response to corresponding ones of the plurality of sums being equal to zero; and defining the ones of the plurality of subsequences to be "reliably active" in response to the corresponding ones of the plurality of sums being greater than a predetermined value.

27. The communication receiver of claim 23, wherein the step of determining whether the communication system is time-shared comprises the steps of:

determining the communication system to be time-shared in response to at least one of the plurality of subsequences being defined as inactive and at least one of the plurality of subsequences being defined as reliably active; and otherwise determining the communication system to be continuous.

28. The communication receiver of claim 23, further comprising the step of maintaining a record of P signal quality pass/fail decisions for P most recent transmissions of the plurality of subsequences, P being a predetermined positive integer value.

29. The communication receiver of claim 28, wherein the step of selecting from operation in the scanning mode and operation in the locked mode comprises the step of changing from the locked mode to the scanning mode in response to the plurality of signal quality pass/fail decisions being "fail" in more than a pre-programmable number of the P most recent transmissions.

30. The communication receiver of claim 28, wherein the step of selecting from operation in the scanning mode and operation in the locked mode comprises the step of changing from the scanning mode to the locked mode in response to the plurality of signal quality pass/fail decisions being "pass" in more than a pre-programmable number of the P most recent transmissions.

* * * * *